United States Patent
Redmann et al.

(10) Patent No.: US 11,911,949 B2
(45) Date of Patent: Feb. 27, 2024

(54) ROTATING NOZZLE STRUCTURE AND METHOD

(71) Applicant: Wisconsin Alumni Research Foundation, Madison, WI (US)

(72) Inventors: Alec Redmann, Madison, WI (US); Tim Osswald, Madison, WI (US); Allen Jonathan Román, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/386,129

(22) Filed: Jul. 27, 2021

(65) Prior Publication Data

US 2023/0032408 A1 Feb. 2, 2023

(51) Int. Cl.
*B29C 48/33* (2019.01)
*B29C 35/02* (2006.01)
*B29C 48/86* (2019.01)
*B29C 48/92* (2019.01)
*B29C 48/25* (2019.01)

(52) U.S. Cl.
CPC .......... *B29C 48/33* (2019.02); *B29C 35/0255* (2013.01); *B29C 35/0288* (2013.01); *B29C 48/865* (2019.02); *B29C 48/92* (2019.02); *B29C 48/266* (2019.02); *B29C 2948/92209* (2019.02); *B29C 2948/92704* (2019.02)

(58) Field of Classification Search
CPC ..... B29C 48/33; B29C 48/266; B29C 48/865; B29C 48/92; B29C 2948/92209; B29C 2948/92704
See application file for complete search history.

(56) References Cited

U.S. PATENT DOCUMENTS

| 6,450,796 B1 * | 9/2002 | Groff ...................... B29C 48/06 425/464 |
| 7,128,862 B2 | 10/2006 | Wang |
| 8,875,976 B2 | 11/2014 | Schultz et al. |
| 2002/0071772 A1 | 6/2002 | Isogai et al. |

(Continued)

FOREIGN PATENT DOCUMENTS

WO 03-101630 A1 12/2003

OTHER PUBLICATIONS

ISA/KR, PCT/US2022/038375, International Search Report and Written Opinion (ISR/WO) dated Nov. 4, 2022, Tae Wook Park (11 pages).

*Primary Examiner* — Yunju Kim
(74) *Attorney, Agent, or Firm* — Crawford Maunu PLLC

(57) ABSTRACT

Aspects of the disclosure are directed to methods and apparatus involving the extrusion of polymers or other materials. As may be implemented in accordance with various embodiments, a polymer is delivered into an inlet of a nozzle structure having the inlet and an outlet. The polymer is viscously heated and melted by rotating the nozzle structure about an axis extending through the inlet and the outlet, therein facilitating extrusion of the melted polymer through the nozzle structure outlet. A polymer supply may deliver the polymer into the nozzle structure inlet, and a coupler may facilitation rotation of the nozzle structure. A driver may further operate to control rotation of the nozzle structure relative to the coupler, for instance by generating a rotational output that causes rotation of the nozzle structure.

20 Claims, 4 Drawing Sheets

(56) References Cited

U.S. PATENT DOCUMENTS

2002/0147863 A1  10/2002  Barrenscheen et al.
2017/0368739 A1* 12/2017  Brennan ................ B33Y 30/00
2020/0147863 A1*  5/2020  Coulter ................ B29C 64/241

* cited by examiner

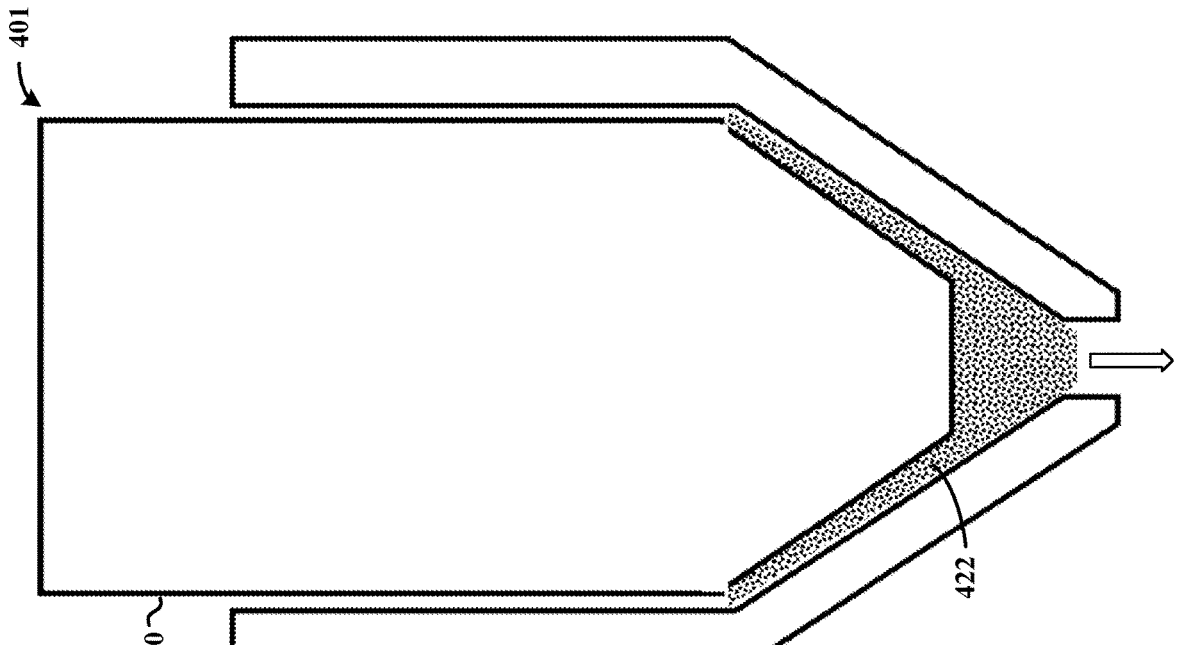
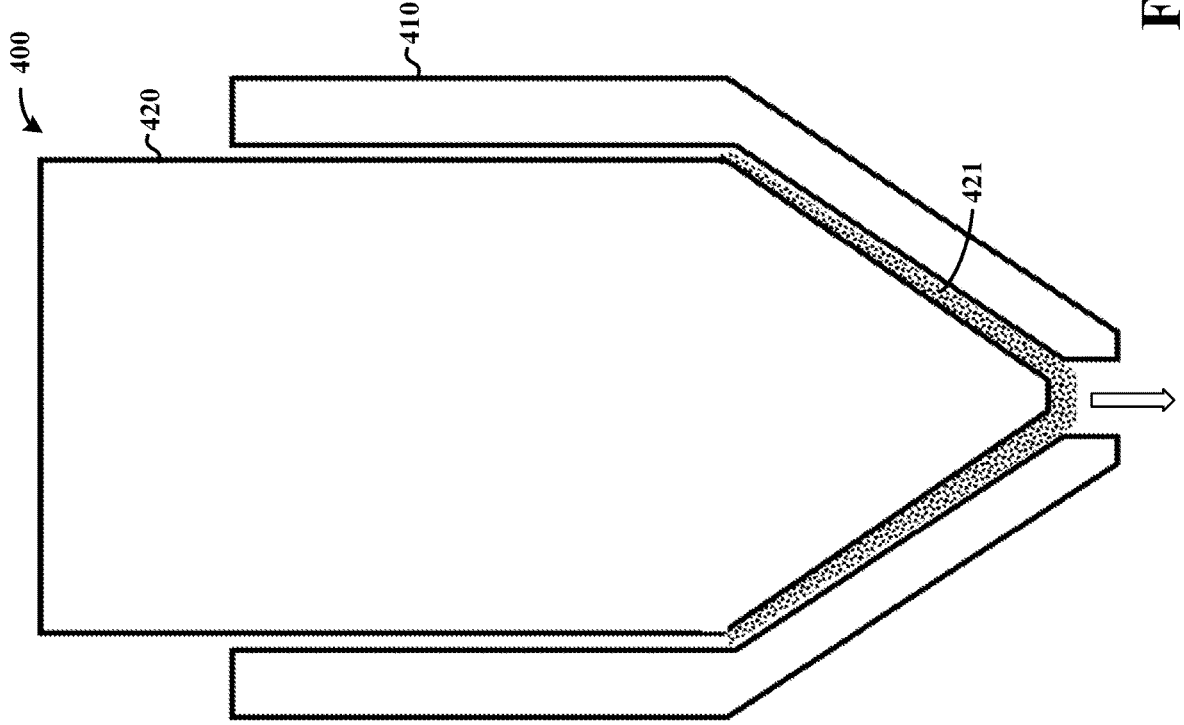
FIG. 4

ROTATING NOZZLE STRUCTURE AND METHOD

BACKGROUND

For many applications, it is desirable to dispense or extrude material such as polymer or metal. Doing so may involve heating the material such that it may be dispensed through a nozzle. These approaches have been utilized in a variety of manufacturing approaches.

In many applications, sufficient heat must be introduced to a dispensing or extrusion nozzle via which material is passed, to facilitate melting of the material. This may be carried out, for example, in a polymer process in which polymer material is dispensed and deposited in an additive manufacturing scenario. The speed at which the polymer material is deposited may be limited by the ability of a nozzle wall to conduct heat and melt the polymer, such as a solid or semisolid filament. Printing slowly allows such a filament to melt such that it may be more easily pushed through the nozzle. The temperature at which a nozzle is held may be limited by local degradation than can occur where the polymer contacts the nozzle wall.

These and other matters have presented challenges to dispensing material for a variety of applications.

SUMMARY

Various example embodiments are directed to methods and apparatuses involving extrusion, their application and their manufacture. Such embodiments may be useful for enhancing the heating and melting of a polymer being extruded, such as may be implemented in additive manufacturing and other polymer applications.

In various embodiments, a polymer is delivered into an inlet of a nozzle structure having the inlet and an outlet, and the polymer is viscously heated and melted by rotating the nozzle structure about an axis extending through the inlet and the outlet, therein facilitating extrusion of the melted polymer through the nozzle structure outlet. This may, for example, increase a rate of heating of the polymer as it is presented into the nozzle structure, which may enhance the speed at which the polymer is extruded from the nozzle structure. When implemented in additive manufacturing processes, this approach may thus increase the speed at which three-dimensional articles may be manufactured.

As may be implemented in accordance with one or more embodiments, an apparatus comprises a nozzle structure having an inlet and an outlet and an inner nozzle structure wall defining an opening extending to the inlet and outlet. The apparatus also includes a coupler to facilitate rotation of the nozzle structure about an axis extending through the outlet, and a driver configured and arranged with the nozzle structure and coupler to rotate the nozzle structure about the axis. The driver may be configured and arranged with the nozzle structure and coupler to introduce shear stress within a polymer being extruded through the nozzle structure by rotating the nozzle structure about the axis and therein viscously heating and melting the polymer as the polymer passes through the nozzle structure.

In accordance with another embodiment, an apparatus includes a nozzle structure, a polymer supply, a coupler and a driver. The nozzle structure has an inlet and an outlet, the inlet being configured to receive a polymer into the nozzle structure, and the polymer supply is configured to deliver the polymer into the nozzle structure inlet. The coupler facilitates rotation of the nozzle structure about an axis extending through the outlet, and the driver is configured and arranged with the nozzle structure and coupler to viscously heat and melt the polymer by rotating the nozzle structure about the axis, therein facilitating extrusion of the melted polymer through the nozzle structure outlet along the axis.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIG. 4 shows a nozzle structure under respective conditions in which the nozzle is not rotated and in which the nozzle is rotated, as may be implemented in accordance with one or more embodiments.

Figure 1:
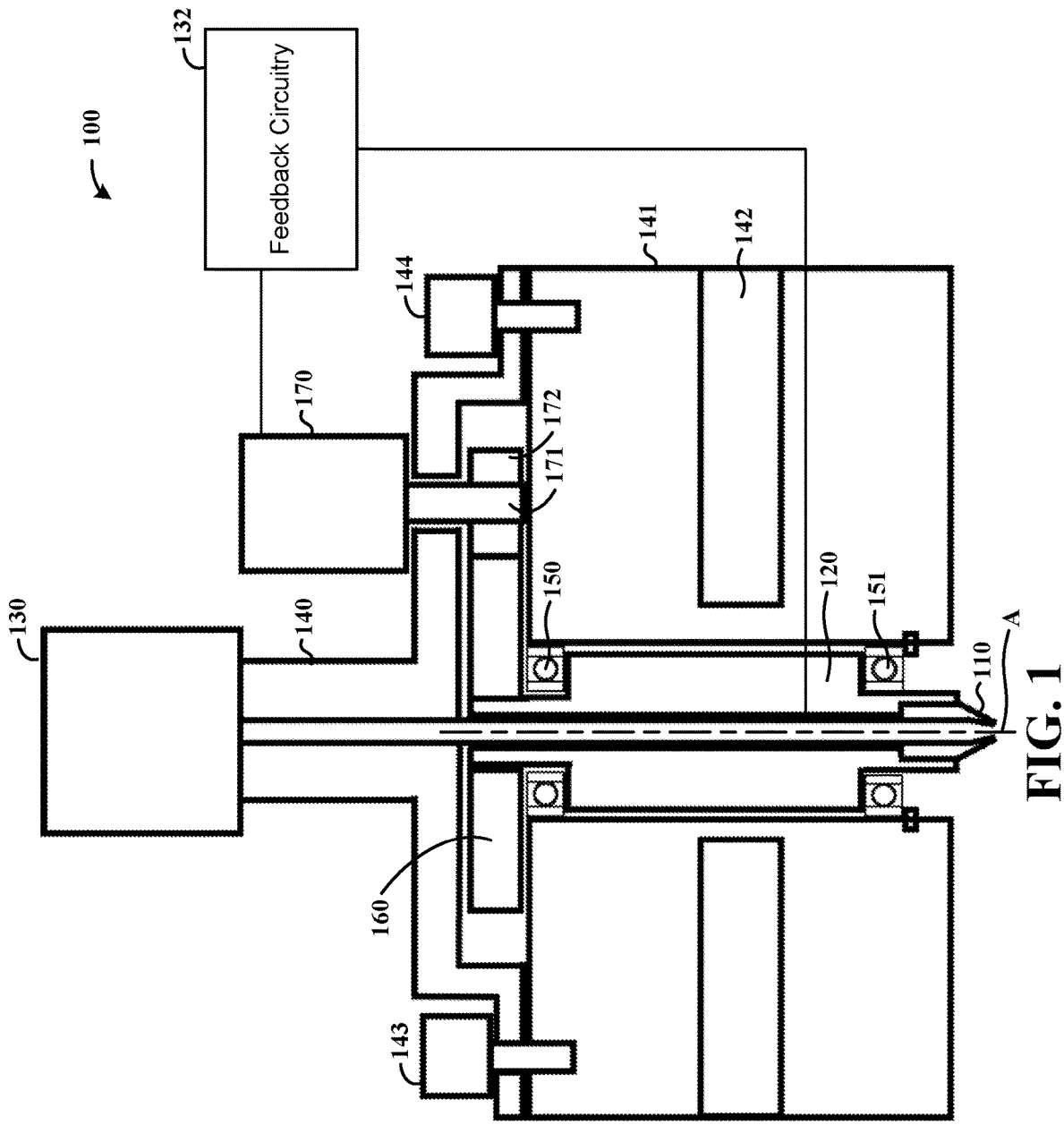
FIG. 1 shows an apparatus for dispensing material and including a rotatable nozzle structure, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving polymer deposition and/or extrusion, including those applicable to additive manufacturing. In certain implementations, aspects of the present disclosure have been shown to be beneficial when used in the context of polymer extrusion in which heat is utilized to melt the polymer in a nozzle structure through which it is extruded. Particular approaches involve rotating a nozzle structure into which a polymer is introduced, and using the rotation to generate shear in the polymer that generates heat and melts the polymer, while the polymer is being passed through the nozzle structure. While not necessarily so limited, various aspects may be appreciated through a discussion of examples using such exemplary contexts.

In connection with various embodiments, it has been recognized/discovered that heating polymer material via the introduction of shear within a nozzle structure is particularly effective, for example relative to applying external heat to a nozzle structure. For instance, introducing shear within the nozzle structure results in heat generation within the nozzle structure, and can mitigate external dissipation (e.g., as discussed in the background above).

It has further been recognized/discovered that rotating the nozzle structure facilitates mixing of the polymer within the nozzle structure. This may, for example, help to evenly distribute heat by mixing different portions of the polymer in respective states including and/or between solid and liquid states. Further, where other materials are present in the polymer, for example to provide desirable properties in a component being manufactured, these materials may be dispersed via the rotation of the nozzle structure and related viscous heating.

Specific embodiments ae directed to rotating a nozzle structure at high speeds, such as 100-1000 RPM, 100-10,000 RPM, or 100-100,000 RPM, to heat and cause polymer along in inner nozzle structure wall to shear and lead to viscous dissipation. This heat speeds up the conduction between the nozzle structure wall and solid polymer filament may facilitate higher extrusion rates, for instance to increase 3-D printing speeds. This approach may utilize generally high viscosity characteristics of polymers to generate heat due to the internal friction (e.g., viscous dissipation). This viscous dissipation and the resulting additional internal heat can be utilized to promote the melting of polymer material, such as a solid (or partially solid) polymer filament.

Embodiments characterized herein may be utilized in a variety of manufacturing processes. Certain embodiments utilize Fused Filament Fabrication (FFF) for 3D printing in which a plastic filament is fed through a heating element, producing a polymer melt that is deposited through a nozzle structure. The nozzle structure is rotated, introducing shear and generating heat that augments heat provided via the heating element for melting the polymer.

In a particular embodiment, an apparatus includes a nozzle structure having an outlet and an inlet to receive polymer into the nozzle structure, and a polymer supply to deliver the polymer into the nozzle structure inlet, such as by conveying a polymer filament into the inlet. The apparatus also includes a coupler that facilitates rotation of the nozzle structure about an axis extending through the outlet, and a driver that operates with the nozzle structure and coupler to viscously heat and melt the polymer by rotating the nozzle structure about the axis and facilitating extrusion of the melted polymer through the nozzle structure outlet. For instance, the nozzle structure may include inner sidewalls (e.g., with a cylindrical type structure) that, upon rotation of the nozzle structure while the polymer supply applies pressure to push the polymer through the nozzle structure, introduce viscous heating as may involve the application of friction/shear stress to the polymer therein causing frictional/viscous heating and melting. The length of the nozzle structure may be set to control the amount of frictional heating as well, for example to include a traditional nozzle near the outlet and an extended region near the inlet (e.g., as in an extended cylinder). Further, the nozzle structure may be separate from a further supply cylinder that is also rotated along with and/or in a different manner than the nozzle structure (e.g., with different speed of rotation and/or different rotational direction). This additional heating may reduce or replace any heating otherwise applied to raise the temperature of the nozzle structure for melting the polymer. Further, the frictional heating may be instantaneously controlled by dynamically changing the rate of rotation.

In some implementations, the apparatus includes a frame that facilitates relative rotation between the coupler and the nozzle structure. For instance, the coupler may couple the nozzle structure to the frame, to facilitate rotation of the nozzle structure relative to frame. The coupler may include, for example, bearings, races or other componentry that permit rotation of the nozzle structure. The driver may include a motor coupled to the nozzle structure to apply a rotational force to the nozzle structure that causes the nozzle structure to rotate about the axis. The coupling may involve, for example, belts, gears, drive shafts, or other componentry that translates force. In some implementations, the nozzle structure is fixed to the frame and the coupler facilitates rotation of the nozzle structure by rotating the frame and nozzle structure together. The driver may thus include a motor that applies a rotational force to the frame that causes both the frame and nozzle structure to rotate together about the axis.

The apparatus may also include a heater to heat the nozzle structure and therein facilitate melting of the polymer. Electric heating coils, convective, conductive and other heating approaches may be utilized.

In certain embodiments, the driver operates with the nozzle structure to control heating of the polymer by controlling a speed at which the nozzle structure rotates. For instance, the driver may increase the speed to increase heating of the polymer, and decrease the speed to decrease heating of the polymer. Control circuitry, for instance a programmed CPU with a variable voltage output, may be utilized to control the rotational speed in this regard, by coupling the output to a motor that rotates the nozzle structure.

Feedback circuitry may be utilized to provide input for use in controlling the rotational speed of the nozzle structure, for instance to control heating as above. In some implementation, the feedback circuitry is operable to sense temperature of the polymer being passed through the nozzle structure, and generate a feedback output that variably controls the speed at which the nozzle structure rotates based on the sensed temperature. For instance, the feedback circuitry may include a thermocouple or other temperature-reactive component that is responsive to temperature and provides a signal that can be interpreted as a temperature indicator.

Another feedback circuitry implementation involves circuitry that senses backpressure upon polymer being introduced into the nozzle structure inlet and/or within the nozzle structure. The backpressure can be indicative of characteristics of the melted polymer, such as to indicate a degree to which the polymer is melted, and generate a feedback output that can be used as an indicator of a need for more or less frictional heat generation. Accordingly, this feedback output can be used to variably control the speed at which the nozzle structure rotates based on the sensed backpressure. Piezoelectric and other pressure sensors can be used in this regard.

Other embodiments are directed to method-based implementations, such as may be utilized in connection with the apparatuses characterized herein. In a particular embodiment, a polymer is delivered into an inlet of a nozzle structure having the inlet and an outlet, and the polymer is viscously heated and melted by rotating the nozzle structure about an axis extending through the inlet and the outlet. Viscously heating and melting the polymer may include causing shear stress in the polymer via engagement of an inner wall of the nozzle structure with the polymer and corresponding rotation of the nozzle structure. This may facilitate extrusion of the melted polymer through the nozzle structure outlet, for instance by increasing a rate of heating of the polymer as it is presented into the nozzle structure, which may further be utilized to enhance the speed at which the polymer is extruded from the nozzle structure. In certain implementations involving the user of a polymer filament supplied into the nozzle, the filament may be rotated to generate viscous heating.

The nozzle structure may be coupled to a coupler that facilitates rotation of the nozzle structure about an axis extending through the outlet, and a driver may be used to drive rotation of the nozzle structure about the axis and relative to the coupler. For instance, where the coupler utilizes a bearing or other rolling type surface, the driver may apply a rotational force to the nozzle structure via direct or indirect connection in a manner as noted herein. The speed at which the nozzle structure rotates may be dynamically controlled, such as by increasing the speed to increase heating of the polymer, and decreasing speed to decrease heating of the polymer. The temperature of the polymer and/or backpressure on the polymer being passed through the nozzle structure may be sensed and used as feedback for controlling the speed of rotation.

Turning now to the figures, FIG. 1 shows an apparatus 100 for dispensing material and including a rotatable nozzle structure, as may be implemented in accordance with one or more embodiments. The apparatus 100 includes an end portion 110 along with a lead-in portion 120 of the nozzle structure, which are shown coupled to rotate together. A polymer supply 130 (e.g., a polymer filament drive assembly) is coupled to supply polymer material into an inlet of the nozzle structure of the lead-in portion 120. A coupler includes bearings 150 and 151, which operate to facilitate rotation of the nozzle structure about an axis "A" extending through the nozzle structure. A driver includes a motor 170, shaft 171 and pinion 172, and provides a rotational force input to a driven gear 160 that rotates the nozzle structure. As such, the driver may operate with the nozzle structure and coupler to viscously heat and melt polymer being passed through the nozzle structure by rotating the nozzle structure about the axis A, facilitating extrusion of the melted polymer through the nozzle structure outlet (at 110 in a direction extending along the axis).

The apparatus 100 may include upper and lower frames 140 and 141 as shown connected by fasteners 143 and 144, and which are coupled to the bearings 150 and 151. The lower frame 141 may include a heater 142, which may utilize one or more of an electric resistive circuit, heated fluid channel, and heated air channel.

In some implementations, the apparatus 100 includes feedback circuitry 132, which may operate to sense characteristics of the dispensing of material and provide related feedback. For instance, the feedback circuitry 132 may include one or more sensors, such as heat sensors and pressure sensors, in or near the lead-in portion 120 or in another area of the apparatus. Such sensors may provide an indication of temperature, pressure or both, which may be utilized to characterize aspects of melting occurring in the nozzle structure. This feedback can then be used to control the driver 170 for increasing or decreasing rotation of the nozzle structure, and therein controlling the amount of viscous heat generated via the rotation. The feedback circuitry may further operate to generate control signals that control the driver 170, based on the feedback. Similar feedback circuitry may be utilized with other embodiments herein, such as those shown in FIGS. 2 and 3.

As utilized herein, the term "nozzle structure" may refer to a structure that that is coupled to a supply for receiving and dispensing material, such as by extruding or depositing a polymer material. In this context, the nozzle structure may refer to an end structure having a tip (e.g., a nozzle tip) that may be graduated, and may also include a lead-in component coupled to the end structure and via which material is provided to the end structure. In the context of the figures, for example in referring to FIG. 1, the nozzle structure includes end portion 110 and a lead-in portion 120, coupled to one another and rotating together. However, other embodiments may refer to a "nozzle structure" as the end portion 110 and being separate from the lead-in portion 120. Further, certain embodiments may utilize rotation of end portion 110, relative to the lead-in portion 120. For instance, bearings as shown may present between the end portion 110 and lead-in portion 120, allowing the end portion to rotate independently. In such embodiments, one or the end portion 110 and lead-in portion may be rotated while the other is not, or both may be rotated at different speeds and/or directions. Further embodiments may involve additional rotating componentry that passes polymer material being presented to the nozzle structure.

Figure 2:
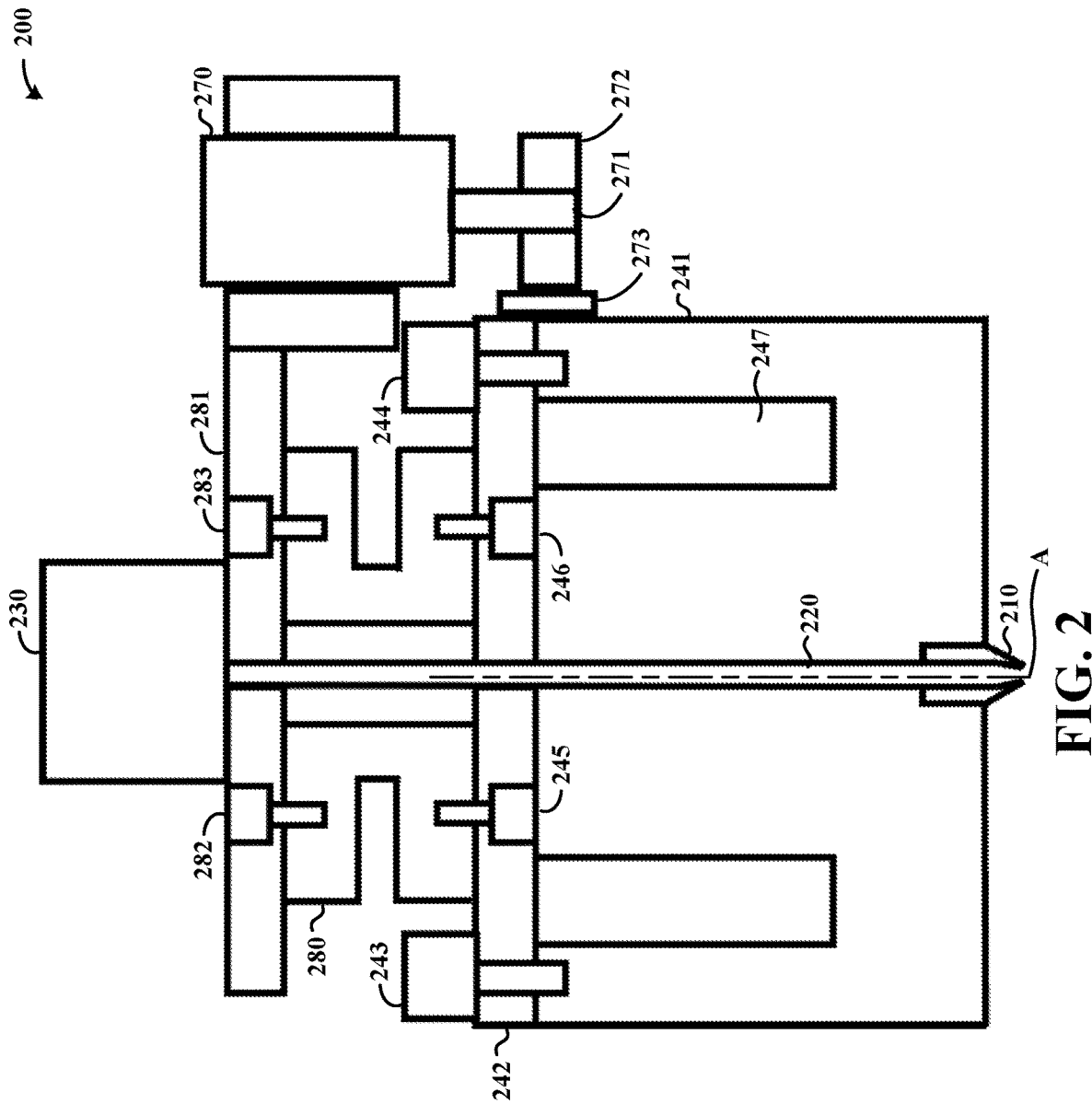
FIG. 2 shows another apparatus for dispensing material and including a rotatable nozzle structure that rotates along with a heater block/frame using an offset motor, in accordance with various embodiments.

FIG. 2 shows another apparatus 200 for dispensing material and including a rotatable nozzle structure that rotates along with a heater block/frame using an offset motor, in accordance with various embodiments. The apparatus 200 includes an end portion 210 along with a lead-in portion 220 of the nozzle structure. A polymer supply 230 (e.g., a polymer filament drive assembly) is coupled to supply polymer material into an inlet of the nozzle structure of the lead-in portion 220. A heater block 241 has a frame 242 connected via fasteners 243 and 244, which is in turn coupled to a slip ring 280 via fasteners 245 and 246. The slip ring 280 is connected to an upper frame 281 via fasteners 282 and 283, and facilitates rotation of the heater block 241 relative to the upper frame about an axis "A" extending through the nozzle structure. A heater 247 may be included within the heater block 241, and the slip ring 280 may provide power for operating the heater.

A driver includes a motor 270 coupled to the upper frame 281, shaft 271 and pinion 272 that drives aa driven gear 273 on the heater block 241. The driver provides a rotational force input to the driven gear 273 that rotates the entire heater block 241. As such, the driver may operate with the nozzle structure and coupler to viscously heat and melt polymer being passed through the nozzle structure by rotating the nozzle structure about the axis A, facilitating extrusion of the melted polymer through the nozzle structure outlet (at 210 in a direction extending along the axis).

Figure 3:
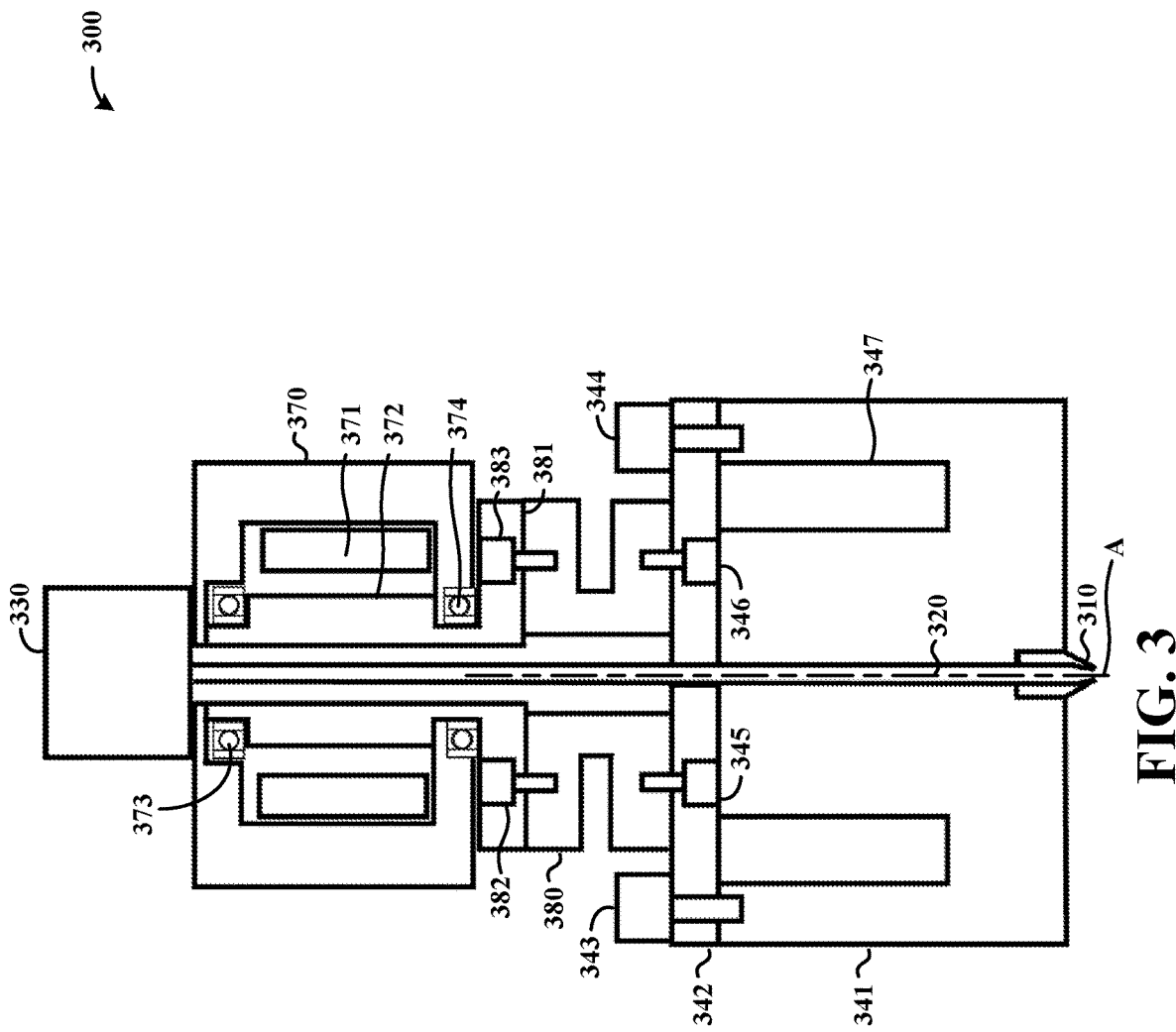
FIG. 3 shows another apparatus for dispensing material and including a rotatable nozzle structure that rotates along with a heater block/frame using an inline motor, in accordance with various embodiments.

FIG. 3 shows another apparatus 300 for dispensing material and including a rotatable nozzle structure that rotates along with a heater block/frame using an inline motor, in accordance with various embodiments. The apparatus 300 includes an end portion 310 along with a lead-in portion 320 of the nozzle structure. A polymer supply 330 (e.g., a polymer filament drive assembly) is coupled to supply polymer material into an inlet of the nozzle structure of the lead-in portion 320. A heater block 341 has a frame 342 connected via fasteners 343 and 344, which is in turn coupled to a slip ring 380 via fasteners 345 and 346. The slip ring 380 is connected to an upper frame 381 via fasteners 382 and 383.

A driver includes a motor 370 having a stator 371 and a rotor 372 that rotates with the upper frame 381 relative to the driver, via bearings 373 and 374. The rotor may, for example, be formed with holes through the shown structure with a filament therein. A heater 347 may be included within the heater block 341, and the slip ring 380 may provide power for operating the heater.

FIG. 4 shows a nozzle structure under respective conditions in which the nozzle is not rotated at 400 and in which the nozzle is rotated at 401, as may be implemented in accordance with one or more embodiments. For instance, the nozzle structure may be implemented as an end portion of nozzle structures 110, 210 and 310 as shown in FIGS. 1-3.

A rotatable nozzle 410 is operable for extruding a polymer type material 420, such as a polymer filament, as it is melted and passed out of the nozzle in a direction as shown by the respective arrows. At 400, a relatively small portion 421 of the polymer filament is shown as being melted, for example with the addition of heat transferred via the nozzle 410. At 401, a larger portion 422 of the polymer filament is shown as being melted, utilizing the rotation of the nozzle 410 to induce viscous heating therein. Such viscous heating may be introduced in addition to heat transferred through the nozzle 410.

Various embodiments herein refer to and/or utilize circuits or circuitry, such as feedback circuitry, which may be illustrated as or using terms such as blocks, modules, device, system, unit, controller, driver, motor and/or other circuit-type depictions (e.g., as depicted in the Figures). Such circuits or circuitry may be used together with other components to exemplify how certain embodiments may be carried out, such as for controlling rotation as characterized herein, and as may further be used for providing a feedback loop. Such circuits or circuitry may correspond to logic circuitry (which may refer to or include a code-programmed/configured CPU), which may carry out a process or method (sometimes "algorithm") by performing feedback and rotation control. In certain embodiments, such circuitry or controller/driver may include one or more computer circuits, including memory circuitry for storing and accessing a program to be executed as a set (or sets) of instructions (and/or to be used as configuration data to define how the programmable circuit is to perform), and an algorithm or process as described herein may be used by the programmable circuit to perform related steps, functions, operations, and activities. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, materials in addition to polymer material may be processed as noted herein. In addition, metal or other material may be processed in accordance with embodiments characterized as utilizing polymer material, yet without the use of polymers. In addition, while certain implementations such as additive manufacturing are characterized, the embodiments noted herein may be utilized in other implementations. Such modifications do not depart from the true spirit and scope of various aspects of the invention, including aspects set forth in the claims.

What is claimed is:

1. An apparatus comprising:
   a nozzle structure having an inlet and an outlet, the inlet being configured to receive a polymer into the nozzle structure;
   a polymer supply configured to deliver the polymer in a solid state into the nozzle structure inlet;
   a coupler to facilitate rotation of the nozzle structure about an axis extending through the outlet; and
   a driver configured and arranged with the nozzle structure and the coupler to viscously heat and melt the polymer within the nozzle structure, from the solid state into a melted state, by rotating the nozzle structure about the axis, therein facilitating extrusion of the melted polymer through the outlet along the axis.

2. The apparatus of claim 1, wherein
   the nozzle structure includes a lead-in portion and an end portion including a graduated nozzle, the lead-in portion being configured to receive the polymer in a solid state and to viscously heat and melt the polymer while the lead-in portion is rotated with the graduated nozzle; and
   the driver is configured and arranged with the nozzle structure and the coupler to viscously heat and melt the polymer, by rotating the nozzle structure about the axis to cause friction between an inner wall of the nozzle structure and a portion of the polymer in contact therewith.

3. The apparatus of claim 1, wherein:
   the coupler couples the nozzle structure to a frame and is configured to facilitate rotation of the nozzle structure relative to frame; and
   the driver includes a motor coupled to the nozzle structure and configured to apply a rotational force to the nozzle structure that causes the nozzle structure to rotate about the axis.

4. The apparatus of claim 1, wherein the nozzle structure is fixed to a frame and the coupler is configured to facilitate rotation of the nozzle structure by rotating the frame and nozzle structure together.

5. The apparatus of claim 4, wherein the driver includes a motor coupled to the frame and configured to apply a rotational force to the frame that causes the frame and nozzle structure to rotate together about the axis.

6. The apparatus of claim 1, further including a heater configured to heat the nozzle structure and therein facilitate melting of the polymer.

7. The apparatus of claim 1, wherein the driver includes a motor having an output coupled to drive rotation of the nozzle structure via a rotational output force.

8. The apparatus of claim 1, wherein the driver is configured and arranged with the nozzle structure to control heating of the polymer by controlling a speed at which the nozzle structure rotates, including increasing the speed to increase heating of the polymer, and including decreasing speed to decrease heating of the polymer.

9. The apparatus of claim 8, further including a feedback circuit configured to sense temperature of the polymer being passed through the nozzle structure, and to generate a feedback output that variably controls the speed at which the nozzle structure rotates based on the sensed temperature.

10. The apparatus of claim 8, further including a feedback circuit configured to sense backpressure upon the polymer being introduced into the nozzle structure inlet, the backpressure being indicative of characteristics of the melted polymer, and to generate a feedback output that variably controls the speed at which the nozzle structure rotates based on the sensed backpressure.

11. The apparatus of claim 1, wherein the driver is configured and arranged with the nozzle structure and the coupler to viscously heat and melt the polymer by introducing shear stress in the polymer via the rotation of the nozzle structure and therein viscously heating the polymer as the polymer passes through the nozzle structure.

12. An apparatus comprising:
    a nozzle structure having a cylindrical lead-in portion having an inlet, an end portion including a graduated nozzle and having an outlet, and an inner wall defining an opening extending to the inlet and outlet;

a coupler to facilitate rotation of the nozzle structure about an axis extending through the outlet and to melt polymer received in a solid state at the inlet and to present the melted polymer to the graduated nozzle, including rotating the cylindrical lead-in portion and the graduated nozzle together; and a driver configured and arranged with the nozzle structure and the coupler to rotate the nozzle structure about the axis.

13. The apparatus of claim 12, wherein the driver is configured and arranged with the nozzle structure and the coupler to introduce shear stress within a polymer being extruded through the nozzle structure by rotating the nozzle structure about the axis and therein viscously heating and melting the polymer as the polymer passes through the lead-in portion of the nozzle structure.

14. The apparatus of claim 12, wherein the driver is configured and arranged to rotate the nozzle based on feedback indicative of characteristics related to the nozzle and including at least one of: temperature, pressure and a combination thereof.

15. A method comprising:
delivering a polymer in a solid state into an inlet of a cylindrical lead-in portion of a nozzle structure that also has a graduated nozzle having an outlet; and viscously heating and melting the polymer in the cylindrical lead-in portion by rotating the nozzle structure about an axis extending through the inlet and the outlet, therein facilitating extrusion of the melted polymer through the outlet.

16. The method of claim 15, wherein:
the nozzle structure is coupled to a coupler configured to facilitate rotation of the nozzle structure about an axis extending through the outlet; and rotating the nozzle structure includes using a driver do drive rotation of the nozzle structure about the axis and relative to the coupler.

17. The method of claim 15, wherein viscously heating and melting the polymer includes causing shear stress in the polymer via engagement of an inner wall of the nozzle structure with the polymer and corresponding rotation of the nozzle structure.

18. The method of claim 15, wherein viscously heating and melting the polymer includes dynamically controlling a speed at which the nozzle structure rotates, including increasing the speed to increase heating of the polymer, and decreasing speed to decrease heating of the polymer.

19. The method of claim 15, further including sensing temperature of the polymer being passed through the nozzle structure, and generating a feedback output that variably controls rotational speed at which the nozzle structure rotates based on the sensed temperature.

20. The method of claim 15, further including sensing backpressure upon the polymer being introduced into the nozzle structure inlet, the backpressure being indicative of characteristics of the melted polymer, and generating a feedback output that variably controls rotational speed at which the nozzle structure rotates based on the sensed backpressure.

* * * * *